Sept. 22, 1936.                L. BARRETT                2,055,061
                             PERCOLATING UNIT
                            Filed May 19, 1934

Inventor
LEON BARRETT
By Leon Edelson
     Attorney

Patented Sept. 22, 1936

2,055,061

UNITED STATES PATENT OFFICE 2,055,061

PERCOLATING UNIT

Leon Barrett, Philadelphia, Pa.

Application May 19, 1934, Serial No. 726,449

8 Claims. (Cl. 53—3)

This invention relates to percolating units for use in making beverages such as coffee and tea, it being among the principal objects of the present invention to provide a percolating unit of such improved design and construction as to permit the most effective extraction of the juices and flavors from the beverage-producing ingredients.

Further objects of the invention are to provide a percolating unit which is constructed entirely of glass, thus insuring the ultimate of cleanliness in service; to provide an all-glass percolating unit having a minimum number of parts thereby rendering the same exceedingly simple in construction and inexpensive to manufacture and at the same time adapting it to be readily assembled and disassembled for purposes of filling the interior thereof with the brew ingredient and for cleaning the parts thereof; and to provide in such a percolating unit integrally formed means for quick-detachably securing the separable parts together.

Other objects of the invention and advantages resulting from the use thereof will appear more fully hereinafter.

The invention consists substantially in the combination, construction, location and relative arrangement of parts, all as will be described more fully hereinafter, as shown in the accompanying drawing and as finally pointed out in the appended claims.

In the said accompanying drawing wherein is illustrated a preferred embodiment of the invention:—

Figure 1:
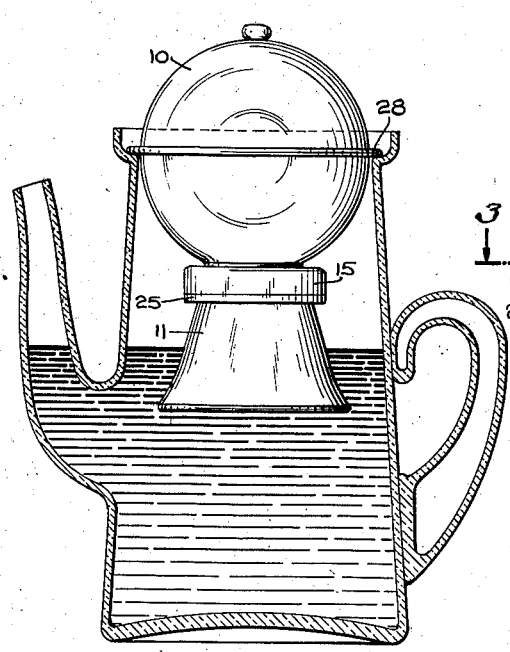
Figure 2:
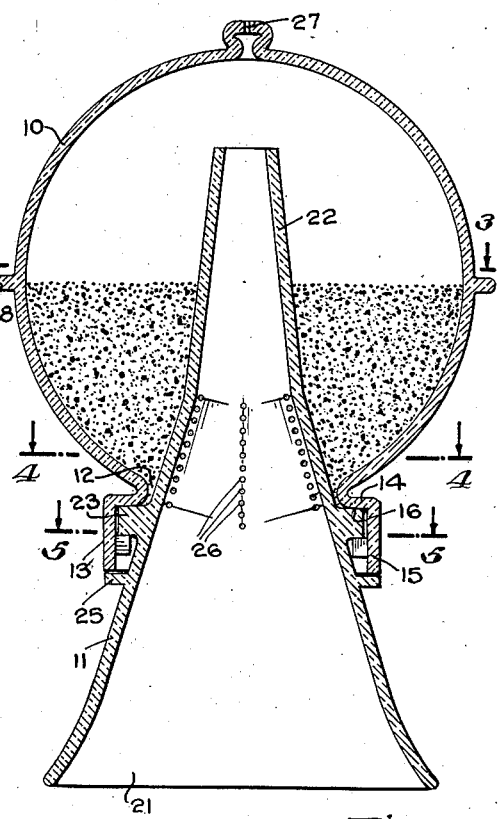
Figure 3:
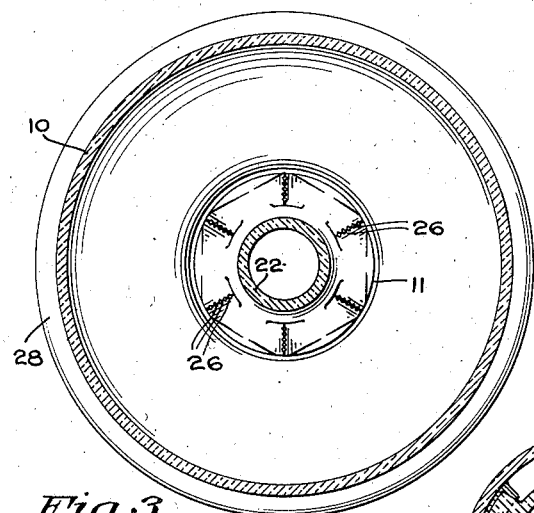
Figure 4:
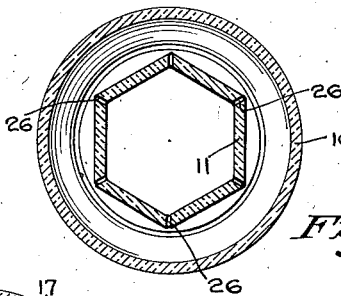
Figure 5:
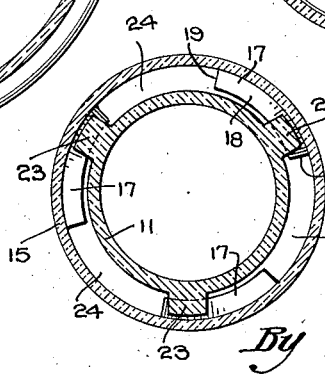

Figure 1 is a side elevational view of the percolating unit constructed in accordance with and embodying the principles of the present invention, the unit being shown operatively supported within a vessel or container in which the beverage is to be brewed;

Figure 2 is a vertical sectional view of the assembled percolating unit showing the brew ingredient contained therein; and Figures 3, 4 and 5 are horizontal sectional views taken respectively along the lines 3—3, 4—4 and 5—5 of Figure 2.

Referring now more particularly to the drawing, it will be observed that the percolating unit as constructed in accordance with the principles of the present invention consists of only two parts, each of which is composed entirely of glass, preferably of relatively low thermal expansion and of sufficient strength to withstand the use for which the percolating unit is intended. The first of these parts, designated generally by the reference numeral 10, comprises the upper member or head of the unit and is preferably of substantially spherical shape, although it will be understood that the particular shape of this upper member 10 is not material to the present invention so long as the shape is such as to afford an adequate chamber, when the two parts of the percolating unit are assembled, within which to receive the beverage producing ingredients. The second part of the unit, which is designated generally by the reference numeral 11 and which is also constructed entirely of glass, is generally in the form of an inverted funnel, as appears most clearly in Figure 2, the upwardly projecting stem of which is adapted to be projected upwardly into the interior of the bulbous body 10.

Describing these parts more specifically, it will be observed that the upper bulbous body 10 is provided in the bottom thereof with an opening 12 preferably formed by providing the body 10 with an integrally formed annular collar 13 having the right-angle sections 14 and 15 so as to provide an annular seat 16 extending marginally about the opening 12 of the member 10. Integrally formed upon the internal surface of the annular wall section 15 of the said collar 13 are a plurality of circumferentially spaced bosses or projections 17, each of these bosses being of substantial length circumferentially of the wall sections 15 upon which they are formed and being further provided with similarly inclined upper surfaces 18, the inclinations being such with respect to the horizontal plane of the bottom surfaces of these bosses as to provide in each of them a relatively thin leading edge 19 and a relatively thick opposite edge 20.

The bottom member 11 of the percolating unit is of the construction best shown in Figure 2 wherein it will be observed that this member is generally of inverted funnel shape the enlarged open end 21 of which presents downwardly with respect to the upper member 10. This inverted funnel shaped member 21 is provided in its upper extremity with a tubular stem 22 which is adapted to be interiorly disposed within the bulbous body 10 when the parts 10 and 11 are assembled together in operative relation. Formed integrally upon the external surfaces of the member 11 are a plurality of circumferentially spaced radially extending lugs 23, one such lug being provided for each of the internal projections 17 formed upon the annular section 15 of the upper body 10, these lugs 23 being so designed that they may be respectively passed freely upwardly through the spaces 24 between the proximate ends of the said internal projections 17 for subsequent engagement with the inclined surfaces 18 of the latter when the parts 10 and 11 are rotated relatively to one another. To effect this engagement it is merely necessary to project the member 11 upwardly into the interior of the member 10 sufficiently to cause the upper surfaces of the lugs 23 of the member 11 to engage against the marginal seat 14 whereupon, by relatively rotating the parts 10 and 11 about their common vertical axis, the lugs 23 are respectively wedged firmly against the said seat 14 by the action of the inclined surfaces 18 upon the bottoms of the lugs 23. There is thus provided a quick-detachable bayonet and slot type of connection between the parts 10 and 11 of the unit which insures the ready assembly and disassembly of these parts as desired. Preferably, the member 11 is provided with an integrally formed annular flange 25 projecting radially outwardly from the external surfaces thereof and spaced from the lugs 23 sufficiently to permit said flange 25 to engage the free edge of the annular wall section 15 of the upper member 10 when the parts have been relatively rotated into their assembled relation, the flange 25 thus serving as an effective seal between the parts 10 and 11 immediately beneath the bayonet and slot connections for preventing the escape of any of the beverage producing ingredients from within the interior of the unit.

The section of the member 11 immediately above the plane of the lugs 23 thereof is provided with a plurality of apertures 26 in the wall thereof through which the water of condensation, which drops upon the brew producing ingredients contained within the unit and percolates therethrough, finally emerges. Preferably, these apertures 26 are confined within the zone extending between the plane of the lugs 23 and an upper plane disposed somewhat below the normal upper level of the brew producing ingredients. Manufacturing considerations make it preferable to construct this intermediate perforated section of the member 11 of a shape having a polygonal cross-section, the perforations 26 being preferably formed in the corners of the intermediate section so formed. Of course, it will be understood that this invention is not limited to any particular cross-sectional form in any part of the member 11 and accordingly the perforated intermediate section of this member may be other than of polygonal cross-section.

Integrally formed in the upper part of the bulbous body 10 is an apertured bead 27 the purpose of which is to afford a vent for relieving the interior of the body 10 of excessive pressures which may be built up therein. Also, the body 10 may be provided substantially in the horizontal diametrical plane thereof with a circumferentially extending flange or rib 28 which serves the dual function of reinforcing the member and supporting the assembled unit upon the top edge of a vessel in the manner shown in Figure 1. If desired, the vessel within which the percolating unit is disposed may be designed complementally to the percolating unit so that when the lower edge of the member 11 of the latter rests upon the bottom of the vessel the rib 28 of the member 10 of the percolating unit rests upon the upper edge of the vessel so that in effect the percolating unit itself serves as a lid for the vessel.

In filling the percolating unit with the beverage producing ingredient, such as coffee grounds, the parts 10 and 11 are separated one from the other by relatively rotating the same so as to effect the disengagement of the lugs 23 from the inclined surfaces of the projections 17, thus permitting the member 11 to be axially withdrawn bodily from the member 10. The member 10 is then held in inverted position while the coffee grounds are placed therein following which the member 11 is projected into the member 10 and interlocked therewith in the manner already described. The percolating unit, thus filled with the coffee grounds, is ready for use. In the use of the percolating unit just described any type of liquid receptacle may be employed, it being merely necessary that this receptacle be adapted to contain a quantity of liquid sufficient to reach above the bottom opening 21 of the member 11. The filled or partially filled receptacle, with the percolating unit disposed therein is then placed over any suitable source of heat to effect the necessary boiling of the liquid and as the liquid reaches the boiling point, the steam or vapor generated passes upwardly through the member 11 and into the head of the percolating unit wherein it is immediately condensed upon striking the top surface of the body 10, the resulting water of condensation dropping upon the coffee particles and percolating therethrough for final emergence through the apertures 26.

It will be understood, of course, that the invention is susceptible of various changes and modifications from time to time without departing from the real spirit of general principles thereof and it is accordingly intended to claim the same broadly, as well as specifically, as indicated by the appended claims.

What is claimed as new and useful is:—

1. In a percolating unit of the character described, in combination, an upper bulbous body member constructed entirely of glass and in one piece said body member being adapted to receive beverage producing ingredients and being adapted, while in use, for suspension within a vessel containing a brewing liquid, a one-piece bottom glass member of substantially inverted funnel shape depending from said suspended upper member and having a stem adapted for projection interiorly of said bulbous body member, and coacting means formed integrally in said members for effecting the quick-detachable connection of one to the other, the connection being such that the upper member may be lifted upwardly without effecting its disengagement from the bottom member.

2. In a percolating unit of the character described, in combination, an all-glass bulbous body member for receiving coffee grounds or like material to be brewed having an opening in the bottom thereof, a substantially conically shaped all-glass hollow member projected upwardly through said opening whereby to provide communication to the interior of said bulbous body member by way of said conically shaped member, and coacting locking means respectively formed as integral parts of said members for quick-detachably securing the same together, said unit being disposed, while in use, within a vessel containing a brewing liquid with said bulbous body member in uppermost relation.

3. In a percolating unit of the character described, in combination, an all-glass upper body member of hollow form for receiving coffee grounds or like material to be brewed and having an opening in the bottom thereof which is surrounded by an annular depending flange formed as an integral part thereof, a plurality of circumferentially spaced projections formed upon the internal surface of said flange, said projections having similarly inclined upper surfaces, a substantially conically shaped all-glass member adapted to be partially projected interiorly of said upper member through said bottom opening thereof, said conically shaped member being provided with a plurality of circumferentially spaced radially projecting lugs which are respectively adapted to frictionally engage the inclined surfaces of the projections aforesaid whereby to quick-detachably secure the said members together, said conically shaped member being provided in the section thereof disposed immediately within the said opening with a plurality of apertures for the purpose specified, said unit being disposed, while in use, within a vessel containing a brewing liquid with the first-mentioned body member in uppermost relation.

4. In a percolating unit of the character described, in combination, a substantially ball-shaped member constructed entirely of glass for receiving coffee grounds or like material to be brewed and having an opening at one point in the wall thereof, said member being provided with a planar seat immediately surrounding the said opening and being further provided with a plurality of circumferentially spaced projections spaced axially from said seat, the surfaces of said projections which face said seat being similarly inclined from end to end thereof, a conically shaped member also constructed entirely of glass adapted to be inserted interiorly of said ball-shaped member through the said opening provided in the latter with the flared outer extremity of said conically shaped member disposed exteriorly of said ball-shaped member, said conically shaped member being provided with a plurality of circumferentially spaced radially extending lugs which are adapted, upon relative rotation of said members, to become wedged between the inclined surfaces aforesaid and the said planar seat whereby to secure the said parts together in quick-detachable relation, said unit being disposed, while in use, within a vessel containing a brewing liquid with said ball-shaped member in uppermost relation.

5. In a percolating unit of the character described, in combination, an all-glass substantially ball-shaped member for receiving coffee grounds or like material to be brewed having an opening at one point in the surface thereof, an all-glass conically shaped member the reduced end of which is adapted for insertion upwardly through said opening, means formed integrally upon each of said members and coacting to secure the same together in quick-detachable relation, said members being further respectively provided with integral means which coact when the said parts have been interlocked in assembled relation to form an auxiliary seal therebetween in the immediate vicinity of said coacting interlocking means, said unit being disposed, while in use, within a vessel containing a brewing liquid with said ball-shaped member in uppermost relation.

6. In a percolating unit of the character described, in combination, an all-glass one-piece bulbous body member for receiving beverage producing ingredients, an all-glass one-piece hollow member of substantially conical shape the reduced portion of which is adapted for projection through an opening provided in said bulbous body member, coacting means formed as integral parts of said members for quick-detachably maintaining the same in assembled relation with the said bulbous body member in uppermost relation while the unit is in use, the portion of said conical member which projects interiorly of said bulbout body member being perforated in the zone immediately adjacent the plane of the opening in said bulbous body member.

7. In a percolating unit of the character defined in claim 6, the provision of coacting auxiliary sealing means respectively formed as integral parts of said members.

8. A percolating unit of the character defined in claim 2 wherein the said bulbous body member is provided substantially in the horizontal diametrical plane thereof with a circumferentially extending rib for suspending said body member within the vessel aforesaid.

LEON BARRETT.